United States Patent
Nakao et al.

(10) Patent No.: US 7,706,471 B2
(45) Date of Patent: Apr. 27, 2010

(54) METHOD AND APPARATUS FOR RECEIVING SIGNALS BY A PLURALITY OF ANTENNAS

(75) Inventors: Seigo Nakao, Gifu (JP); Yoshiharu Doi, Gifu (JP); Kiyoshige Ito, Gifu (JP); Akifumi Hirata, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 703 days.

(21) Appl. No.: 11/698,986

(22) Filed: Jan. 29, 2007

(65) Prior Publication Data

US 2007/0248196 A1 Oct. 25, 2007

(30) Foreign Application Priority Data

Jan. 27, 2006 (JP) ............................. 2006-019815

(51) Int. Cl.
*H04L 27/00* (2006.01)
*H03K 9/00* (2006.01)

(52) U.S. Cl. ...................... 375/316; 375/260; 375/267; 375/347

(58) Field of Classification Search ................. 375/316, 375/347, 260, 267
See application file for complete search history.

(56) References Cited

U.S. PATENT DOCUMENTS

| 7,173,990 B2 * | 2/2007 | Kim et al. ................. 375/347 |
| 7,545,891 B1 * | 6/2009 | Pare et al. ................. 375/344 |
| 2007/0047737 A1 * | 3/2007 | Lerner et al. ................. 381/22 |

FOREIGN PATENT DOCUMENTS

JP 2001-285161 A 10/2001

\* cited by examiner

*Primary Examiner*—Ted M Wang
(74) *Attorney, Agent, or Firm*—McDermott Will & Emery LLP

(57) ABSTRACT

A correction unit corrects the phases of received multicarrier signals, respectively, carrier by carrier. A combining unit and a computing unit performs adaptive array processing on the corrected multicarrier signals on a carrier-by-carrier basis. A derivation unit derives, carrier by carrier, a phase for correction to be used by the correction unit, based on error in the multicarrier signals which have undergone the adaptive array processing. The derivation unit updates a frequency for correction about a carrier to which a known signal is assigned, based on error in the carrier, so as to derive a phase for correction and the derivation unit also derives a phase for correction, based on the error in the carrier and the phase for correction in a carrier to which the known signal is assigned.

8 Claims, 12 Drawing Sheets

FIG.3A

| L-STF | L-LTF | L-SIG | HT-SIG | HT-STF | HT-LTF | -HT-LTF | HT-LTF | -HT-LTF | DATA 1 |
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.3B

| L-STF | L-LTF | L-SIG | HT-SIG | HT-STF | HT-LTF | -HT-LTF | HT-LTF | -HT-LTF | DATA 1 |
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |

FIG.3C

| L-STF | L-LTF | L-SIG | HT-SIG | HT-STF | HT-LTF | HT-LTF | DATA 1 |
| L-STF -50ns | L-LTF -50ns | L-SIG -50ns | HT-SIG -50ns | HT-STF -400ns | HT-LTF -400ns | -HT-LTF -400ns | DATA 2 -400ns |

METHOD AND APPARATUS FOR RECEIVING SIGNALS BY A PLURALITY OF ANTENNAS

BACKGROUND OF THE INVENTION

1. Field of the Invention

The present invention relates to a receiving technology, and it particularly relates to a method and apparatus for receiving signals by a plurality of antennas.

2. Description of the Related Art

In general, there is frequency offset between a signal oscillated by a local oscillator in a transmitting apparatus and a signal oscillated by a local oscillator in a receiving apparatus. Accordingly, the receiving apparatus needs a function to compensate for the frequency offset of a received signal. In order to compensate for such frequency offset, the receiving apparatus estimates a frequency offset value. In estimating the frequency offset value, the receiving apparatus generally updates the already-estimated frequency offset sequentially. In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. In such adaptive array antenna technology, too, the frequency offset is corrected (See Reference (1) in the following Related Art List, for instance).

RELATED ART LIST (1) Japanese Patent Application Laid-Open No. 2001-285161.

One of techniques to realize higher data transmission rates by using such an adaptive array antenna technology is MIMO (Multiple-Input Multiple-Output) system. In this MIMO system, a transmitting apparatus and a receiving apparatus are each equipped with a plurality of antennas, and packet signals to be transmitted in parallel are set (hereinafter, each of data and the like to be transmitted in parallel in a packet signal is called "stream"). That is, streams up to the maximum number of antennas are set for the communications between the transmitting apparatus and the receiving apparatus so as to increase the data transmission rates.

Moreover, combining this MIMO system with an OFDM (Orthogonal Frequency Division Multiplexing) modulation scheme results in a higher data transmission rate. In general, the frequency offset in the local oscillator of the transmitting apparatus and in the local oscillator of the receiving apparatus bears the same value in all of subcarriers. Accordingly, the frequency offset is derived based on the pilot signal assigned to at least one subcarrier. However, due to the effect of frequency selective fading in the radio channel between the transmitting apparatus and the receiving apparatus, the frequency offset differs for each subcarrier. The receiving characteristics at the receiving apparatus will degrade unless the effect of apparent frequency offset is sufficiently reduced by the adaptive array technique.

SUMMARY OF THE INVENTION

The present invention has been made in view of such circumstances and a general purpose thereof is to provide a receiving technique that reduces the effect of apparent frequency offset even in the case when frequency offset differs subcarrier by subcarrier.

In order to resolve the above problems, a receiving apparatus according to one embodiment of the present invention comprises: a receiver which receives multicarrier signals in which a known signal is assigned to at least one carrier, respectively, by a plurality of antennas; a correction unit which corrects, carrier by carrier, phases of the multicarrier signals received respectively by the plurality of antennas in the receiver; a processing unit which performs adaptive array processing on the multicarrier signals corrected by the correction unit, for each carrier; and a derivation unit which derives, per carrier, a phase for correction to be used for the correction unit, based on error in the multicarrier signals which have undergone the adaptive array processing in the processing unit. The derivation unit derives the phase for correction by updating a frequency for correction about a carrier to which the known signal is assigned, based on error in said carrier, and derives the phase for correction about a carrier to which the known signal is not assigned, based on error in said carrier and the phase for correction in the carrier to which the known signal is assigned.

By employing this embodiment, the phase for correction is derived for not only a carrier to which the known signal is assigned but also a carrier to which the known signal is not assigned and therefore even if the frequency offset differs per carrier, the frequency offset can be corrected.

When deriving the phase for correction about the carrier to which the known signal is not assigned, the derivation unit may use a phase for correction in a carrier which is assigned in the vicinity of the carrier and to which the known signal is assigned. In such a case, of carries to which the known signals are assigned, the phase for correction assigned to a carrier close thereto is used, so that the difference from the phase for correction can be made smaller even if it is another carrier.

The derivation unit may include: a means which derives, for the carrier to which the known signal is assigned, error in said carrier from a result of the adaptive array processing by the processing unit and a value of the known signal; a means which derives a rotation amount in said carrier, from the derived error and the value of the known signal; a means which updates a frequency for correction in said carrier by the derived rotation amount; and a means which derives a phase for correction in said carrier from the updated frequency for correction. In such a case, the frequency for correction is updated by using the known signal, so that the accuracy of frequency for correction can be enhanced.

The derivation unit may include: a means which derives, for the carrier to which the known signal is not assigned, error in said carrier from a result of the adaptive array processing by the processing unit and a decision value of the result; a means which derives a rotation amount in said carrier, from the derived error and the decision value; and a means which derives a phase for correction in a carrier to which the known signal is not assigned, from the derived rotation amount and a phase for correction in a carrier to which the known signal is assigned. In this case, the phase for correction is derived based on the error and the phase for correction in a carrier to which a known signal is assigned, so that the effect of error that has occurred in the past can be reduced.

The multicarrier signals received by the receiver constitute a packet signal and a preamble is assigned to an anterior part of the packet signal, and the processing unit may include: a means which derives, per carrier, a weight vector used for the adaptive array processing, for each of the multicarrier signals to be received by the plurality of antennas in the receiver, based on the preamble assigned to the packet signal received by the receiver; a means which performs the adaptive array processing, per carrier, based on the derived weight vector; a means which derives an initial phase, per carrier, based on a result of the adaptive array processing and a pilot signal; and a means which corrects the weight vector by the derived initial phase. In such a case, a phase error is derived in a period of time from the end of a preamble until the start of a data signal, the effect of frequency offset caused in this period can be reduced.

The packet signal received by the receiver is constituted by a plurality of streams, and the processing unit may derive an initial phase carrier by carrier in a manner that the initial phase for each stream is derived carrier by carrier and then initial phases in different carriers are combined by weighting them per carrier. In such a case, the initial phases in different streams are combined on a carrier-by-carrier basis, the effect of noise can be reduced.

The multicarrier signal received by said receiver is constituted by a plurality of streams; the processing unit may derive values corresponding respectively to the plurality of streams, by performing the adaptive array processing; and the derivation unit may derive a phase for correction to be used in the correction unit, carrier by carrier, in a manner that rotation amounts are derived, carrier by carrier, for the plurality of streams respectively and then rotation amounts in different streams are combined carrier by carrier.

Another embodiment of the present invention relates to a receiving method. This method comprises: receiving multicarrier signals in which a known signal is assigned to at least one carrier, respectively, by a plurality of antennas; correcting, carrier by carrier, phases of the multicarrier signals received respectively by the plurality of antennas; performing adaptive array processing on the multicarrier signals corrected by the correcting, for each carrier; and deriving, per carrier, a phase for correction to be used in the correcting carrier by carrier, based on error in the multicarrier signals which have undergone the adaptive array processing. The deriving derives the phase for correction by updating a frequency for correction about a carrier to which the known signal is assigned, based on error in said carrier, and derives the phase for correction about a carrier to which the known signal is not assigned, based on error in said carrier and the phase for correction in the carrier to which the known signal is assigned.

When deriving the phase for correction about the carrier to which the known signal is not assigned, the deriving per carrier a phase for correction may use a phase for correction in a carrier which is assigned in the vicinity of the carrier and to which the known signal is assigned. The deriving per carrier a phase for correction may include: deriving, for the carrier to which the known signal is assigned, error in said carrier from a result of the adaptive array processing and a value of the known signal; deriving a rotation amount in said carrier, from the derived error and the value of the known signal; updating the frequency for correction in said carrier by the derived rotation amount; and deriving the frequency for correction in said carrier from the updated frequency for correction.

The deriving per carrier a phase for correction may include: deriving, for the carrier to which the known signal is not assigned, error in said carrier from a result of the adaptive array processing and a decision value of the result; deriving a rotation amount in said carrier, from the derived error and the decision value; and derives a phase for correction in a carrier to which the known signal is not assigned, from the derived rotation amount and a phase for correction in a carrier to which the known signal is assigned.

The multicarrier signals received by the receiving constitute a packet signal and a preamble is assigned to an anterior part of the packet signal, and the performing adaptive array processing for each carrier may include: deriving, per carrier, a weight vector used for the adaptive array processing, for each of the multicarrier signals to be received by the plurality of antennas in the receiving, based on the preamble assigned to the packet signal received by the receiving; performing the adaptive array processing, per carrier, based on the derived weight vector; deriving an initial phase, per carrier, based on a result of the adaptive array processing and a pilot signal; and correcting the weight vector by the derived initial phase. The packet signal received by the receiving is constituted by a plurality of streams, and the performing adaptive array processing for each carrier may derive an initial phase carrier by carrier in a manner that the initial phase for each stream is derived carrier by carrier and then initial phases in different carriers are combined by weighting them per carrier.

The multicarrier signal received by receiving is constituted by a plurality of streams; the performing adaptive array processing for each carrier may derive values corresponding respectively to the plurality of streams, by performing the adaptive array processing; and the deriving per carrier a phase for correction may derive a phase for correction to be used in the deriving per carrier a phase for correction, carrier by carrier, in a manner that rotation amounts are derived, carrier by carrier, for the plurality of streams respectively and then rotation amounts in different streams are combined carrier by carrier.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3C show packet formats in a communication system of FIG. 2;

DETAILED DESCRIPTION OF THE INVENTION

Figure 1:
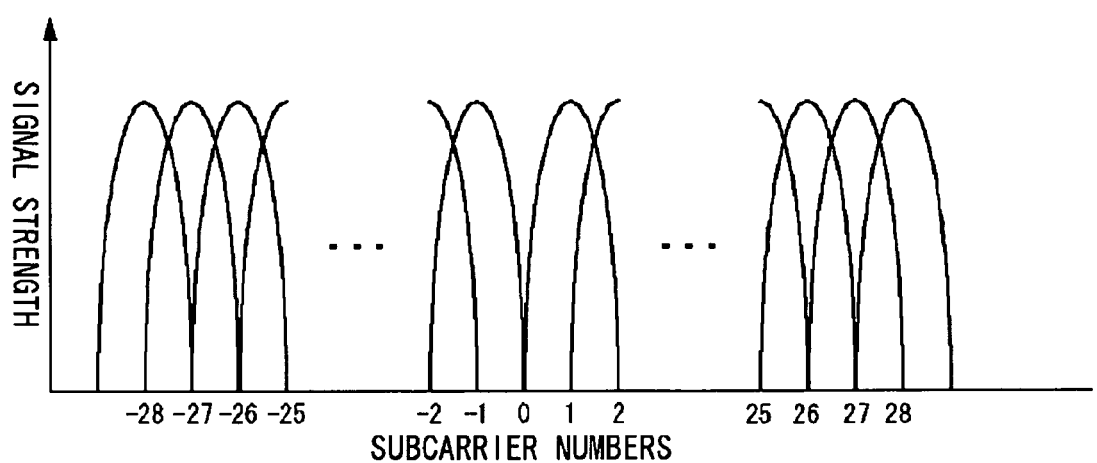
FIG. 1 illustrates a spectrum of a multicarrier signal according to an exemplary embodiment of the present invention.

The invention will now be described by reference to the preferred embodiments. This does not intend to limit the scope of the present invention, but to exemplify the invention.

An outline of the present invention will be given before a specific description thereof. Exemplary embodiments of the present invention relate to a MIMO system comprised of at least two radio apparatuses. One of the radio apparatuses corresponds to a transmitting apparatus whereas the rest thereof correspond to receiving apparatuses. The transmitting apparatus generates a packet signal comprised of a plurality of streams. Each of the plurality of streams is constituted by a multicarrier signal. Pilot signals are assigned to a plurality of subcarriers in the multicarrier signal, and data signals are assigned to the remaining subcarriers. A receiving apparatus receives a packet signal. The packet signal received contains not only the effect of frequency error by a local oscillator but also the effect of frequency selective fading. As a result, the frequency offset differs per subcarrier. By employing a receiving apparatus according to the exemplary embodiments of the present invention, even if the frequency offset differs on a subcarrier-by-subcarrier basis, the following processing will be performed to reduce the adverse effect of frequency offset.

The receiving apparatus not only estimates, based on a pilot signal, a phase used to correct a subcarrier to which the pilot signal is assigned (hereinafter this phase will be referred to as "pilot correcting phase") but also estimates, based on a data signal, a phase used to correct a subcarrier to which the data is assigned to (hereinafter this phase will be referred to as "data correcting phase"). Here, since the pilot signal is a known signal, the estimation of a pilot correcting phase can be done accurately to a certain degree. On the other hand, since the data signal is not a known signal, the receiving apparatus uses information on the pilot correcting phase at the time of estimating the data correcting phase.

The receiving apparatus performs phase correction on the packet signals received by a plurality of antennas, respectively. In so doing, a pilot correcting phase and a data correcting phase are used. Also, the receiving apparatus performs adaptive array processing on the corrected packet signals so as to recover a plurality of streams. Note that weight vectors in the adaptive array processing are derived based on an LMS algorithm, for example, and the values thereof are updated sequentially. Here the pilot correcting phase is derived as follows. That is, the receiving apparatus derives error between each of the plurality of recovered streams and the pilot signal, and then drives a rotation amount from the error and the value of the pilot signal. This processing is performed on each subcarrier and each stream. However, rotation amounts in different streams are combined on a subcarrier-by-subcarrier basis, and a rotation amount for each subcarrier is derived finally. A frequency for correction is updated by the thus derived rotation amount, and a pilot correcting phase is derived by the updated frequency for correction.

The data correcting phase is derived as follows. The processing similar to that for the pilot is performed by use of a decision value of a recovered stream, instead of the value of the pilot signal, so as to derive a rotation amount. The receiving apparatus derives the data correcting phase by adding the already derived pilot correcting phase and the rotation amount. Here, the receiving apparatus uses a pilot correcting phase in a carrier to which a pilot signal is assigned wherein this carrier is one close to the carrier from which a data correcting phase is to be derived. The above processing is performed because of the following reason. There is a possibility of a hard decision by mistake in the streams of a data signal. For this reason, there may be an erroneous propagation generated if the data correcting phase is updated using the hard-decision results in the past. Hence, in the receiving apparatus according to the exemplary embodiments of the present invention does not use the past hard-decision result for the data signal but uses information on current pilot signals so as to calculate a data correcting phase.

FIG. 1 illustrates a spectrum of a multicarrier signal according to an embodiment of the present invention. In particular, FIG. 1 shows a spectrum of a signal in an OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system (hereinafter referred to as a "legacy system") which is not compatible with a MIMO system. One example of legacy systems is a wireless LAN complying with the IEEE 802.11a standard. The unit of one signal in the time domain is the unit of one signal composed of a plurality of subcarriers, and this unit will be called "OFDM symbol".

Here, pilot signals are assigned to the subcarrier numbers "21", "−7", "7" and "21" whereas data signals are assigned to the other remaining subcarrier numbers. The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

As an error correction scheme, convolutional coding is used for these signals. The coding rates for the convolutional coding are set to ½, ¾ and so forth. The number of data to be transmitted in parallel is set variably. As a result thereof, since the modulation scheme, the coding rate and the number of streams are set variably, the data rate is also set variably. It is to be noted that the "data rate" may be determined by arbitrary combination of these factors or by only one of them. If the modulation scheme is BPSK and the coding rate is ½in a legacy system, the data rate will be 6 Mbps. If, on the other hand, the modulation scheme is BPSK and the coding rate is ¾, the date rate will be 9 Mbps.

Figure 2:
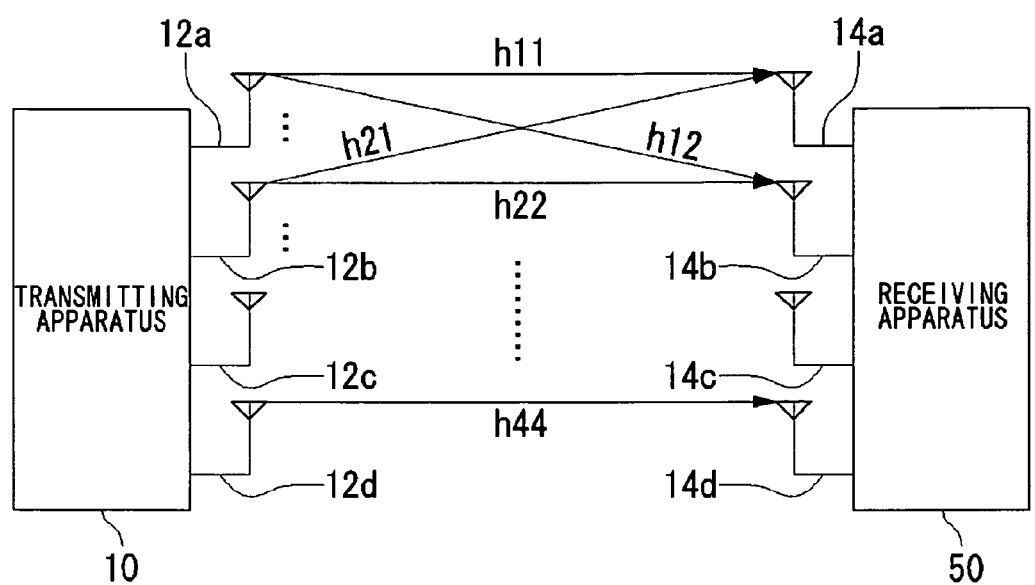
FIG. 2 illustrates a structure of a communication system according to an exemplary embodiment of the present invention.

FIG. 2 illustrates a structure of a communication system 100 according to an exemplary embodiment of the present invention. The communication system 100 includes a transmitting apparatus 10 and a receiving apparatus 50. The transmitting apparatus 10 includes a first antenna 12a, a second antenna 12b, a third antenna 12c and a fourth antenna 12d, which are generically referred to as "antenna 12" or "antennas 12", and the receiving apparatus 50 includes a first antenna 14a, a second antenna 14b, a third antenna 14c and a fourth antenna 14d, which are generically referred to as "antenna 14" or "antennas 14".

An outline of a MIMO system will be described as a structure of the communication system 100. Assume herein that packet signals are transmitted from the transmitting apparatus 10 to the receiving apparatus 50. The transmitting apparatus 10 transmits respectively data of a plurality of streams from the first antenna 12a to fourth antenna 12d, respectively. As a result, the data rate becomes higher. The receiving apparatus 50 receives the data of a plurality of streams by the first antenna 14a to fourth antenna 14d. Further, the receiving apparatus 50 separates the received data through the adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12*i* to the jth antenna 14*j* is denoted by $h_{ij}$. In FIG. 2, the channel characteristic between the first antenna 12*a* and the first antenna 14*a* is denoted by $h_{11}$, that between from the first antenna 12*a* to the second antenna 14*b* by $h_{12}$, that between the second antenna 12*b* and the first antenna 14*a* by $h_{21}$, that between from the second antenna 12*b* to the second antenna 14*b* by $h_{22}$, and that between from the fourth antenna 12*d* to the fourth antenna 14*d* by $h_{44}$. For the clarity of illustration, the other channels are omitted in FIG. 2.

FIGS. 3A to 3C show packet formats in a communication system 100. FIG. 3A represents a case where the number of streams is "4", FIG. 3B a case where the number of streams is "3", and FIG. 3C a case where the number of streams is "2". In FIG. 3A, it is assumed that data contained in four streams are to be transmitted, and packet formats corresponding to the first to fourth streams are shown in order from top row to bottom row.

In the packet signal corresponding to the first stream, "L-STF", "HT-LTF" and the like are assigned as preamble signals. "L-STF", "L-LTF", "L-SIG", and "HT-SIG" correspond to a known signal for AGC setting, a known signal for channel estimation and a control signal compatible with a legacy system, and a control signal compatible with a MIMO system, respectively. The control signal compatible with a MIMO system has, for example, information on the number of streams and the destination of data signals. "HT-STF" and "HT-LTF" correspond to a known signal for AGC setting and a known signal, for channel estimation, compatible with a MIMO system, respectively. On the other hand, "DATA 1" is a data signal. As mentioned above, pilot signals are contained in "DATA 1" and the like. Note that L-LTF and HT-LTF are used not only for AGC setting but also for timing estimation.

In the packet signal corresponding to the second stream, "L-STF(–50 ns)", "HT-LTF(–400 ns)" and the like are assigned as preamble signals. In the packet signal corresponding to the third stream, "L-STF(–100 ns)", "HT-LTF(–200 ns)" and the like are assigned as preamble signals. In the packet signal corresponding to the fourth stream, "L-STF(–150 ns)", "HT-LTF(–600 ns)" and the like are assigned as preamble signals.

Here, "–400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(–50 ns)" is "L-STF" given a cyclic timing shift by a delay of –50 ns. Assume herein that L-STF and HT-STF are each structured by a repetition of an 800 ns duration and that the other parts such as HT-LTF are each constituted by a repetition of a 3.2 μs duration. Here, the CDD is also applied to "DATA 1" to "DATA 4" and the amounts of timing shift are of the same values as those for HT-LTFs assigned anterior thereto.

In the first stream, HT-LTFs are assigned in the order of "HT-LTF", "-HT-LTF", "HT-LTF" and "-HT-LTF" from the top. Here, these in this order are called "a first component", "a second component", "a third component" and "a fourth component" in all of the streams. A receiving apparatus extracts a desired signal for the first stream by computing "first component minus (–) second component plus (+) third component minus (–) fourth component" for received signals of all the streams. The receiving apparatus extracts a desired signal for the second stream by computing "first component+second component+third component+fourth component" for received signals of all the streams. Also, the receiving apparatus extracts a desired signal for the third stream by computing "first component–second component–third component+ fourth component" for received signals of all the streams. Also, the receiving apparatus extracts a desired signal for the fourth stream by computing "first component+second component–third component–fourth component" for received signals of all the streams. These correspond to the fact that the combination of the signs of predetermined components has an orthogonal relationship among the streams. Note that the addition and subtraction processing are done by vector operation.

As with a legacy system, "52" subcarriers are used for the part from "L-LTF" to "HT-SIG" and so forth. Note that "4" subcarriers out of the "52" subcarriers correspond to pilot signals. On the other hand, the fields from "HT-LTF" and its subsequent parts use "56" subcarriers.

In FIG. 3A, the sign of "HT-LTF" is defined as follows. The signs are arranged in order from the top of the first stream as "+ (plus)", "– (minus)", "+" and "–"; the signs are arranged in order from the top of the second stream as "+", "+", "+" and "+"; the signs are arranged in order from the top of the third stream as "+", "–", "–" and "+"; and the signs are arranged in order from the top of the fourth stream as "+", "+", "–" and "–". However, the signs may be defined as follows. That is, the signs are arranged in order from the top of the first stream as "+", "–", "+" and "+"; the signs are arranged in order from the top of the second stream as "+", "+", "–" and "+"; the signs are arranged in order from the top of the third stream as "+", "+", "+" and "–"; and the signs are arranged in order from the top of the fourth stream as "–", "+", "+" and "+". In such signs, too, the orthogonal relationship holds in the combination of signs of predetermined components.

FIG. 3B corresponds to the first to the third stream of FIG. 3A. FIG. 3C is similar to the first stream and second stream of the packet formats shown in FIG. 3A. Here, the assignment of "HT-LTFs" in FIG. 3C differs from that of "HT-LTFs" in FIG. 3A. That is, in the assignment shown in FIG. 3C there are only the first components and the second components of HT-LTFs. In the first stream of FIG. 3C, HT-LTFs are assigned in the order of "HT-LTF" and "HT-LTF" from the top thereof whereas in the second stream, HT-LTFs are assigned in the order of "HT-LTF" and "-HT-LTF" from the top thereof. A receiving apparatus extracts a desired signal for the first stream by computing "first component+second component" for received signals of all the streams. Also, the receiving apparatus extracts a desired signal for the second stream by computing "first component–second component" for received signals of all the streams. As described above, these hold the orthogonal relationship between them.

Figure 4:
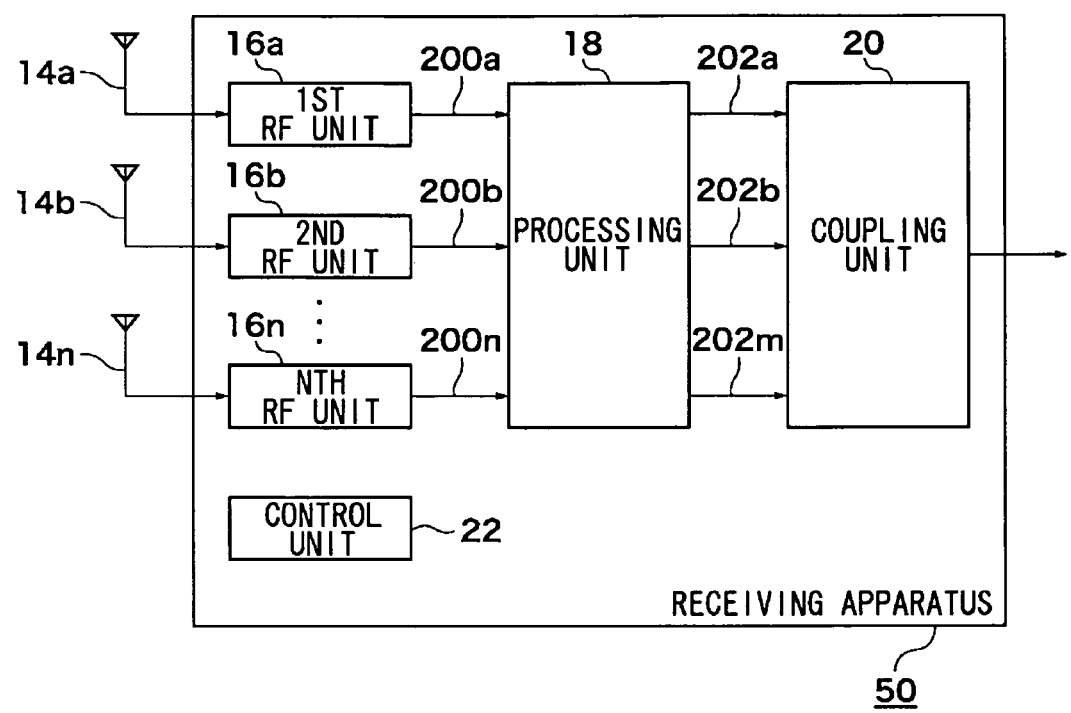
FIG. 4 illustrates a structure of a receiving apparatus shown in FIG. 2.

FIG. 4 illustrates a structure of the receiving apparatus 50. The receiving apparatus 50 includes a first antenna 14*a*, a second antenna 14*b*, ... and an Nth antenna 14*n*, which are generically referred to as "antennas 14", a first RF unit 16*a*, a second RF unit 16*b*, ... and an Nth RF unit 16*n*, which are generically referred to as "RF unit 16", a processing unit 18, a coupling unit 20, and a control unit 22. Signals involved include a first time-domain signal 200*a*, a second time-domain signal 200*b*, ... and an Nth time-domain signal 200*n*, which are generically referred to as "time-domain signal 200", and a first combined signal 202*a*, a second combined signal 202b, ... and an Nth combined signal 202n, which are generically referred to as "combined signal 202".

The antennas 14 are structured by a plurality of antennas 14, and each of them receives a multicarrier signal where a pilot signal is assigned to at least one subcarrier. Here, received multicarrier signals constitute packet signals as shown in FIGS. 3A to 3C, and a preamble signal is assigned to an anterior field of a packet signal.

The RF unit 16 carries out frequency conversion of radiofrequency signal received by the antennas 14 so as to derive baseband signals. The RF unit 16 outputs the baseband signals to the processing unit 18 as the time-domain signals 200. The baseband signal, which is composed of in-phase components and quadrature-phases components, shall generally be transmitted by two signal lines. For the clarity of figure, the baseband signal is presented here by a single signal line only. An AGC (Automatic Gain Control) unit and an A-D conversion unit are also included in the RF unit 16. The AGC unit sets gain in "L-STF" and "HT-STF".

The processing unit 18 converts a plurality of time-domain signals 200 respectively into the frequency domain and performs adaptive array signal processing on the thus converted frequency-domain signals. Then the processing unit 18 outputs the result of adaptive array signal processing as combined signals 202. One combined signal 202 corresponds respectively to a plurality of streams transmitted. Also, the processing unit 18 corrects frequency offsets. It is assumed herein that the combined signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
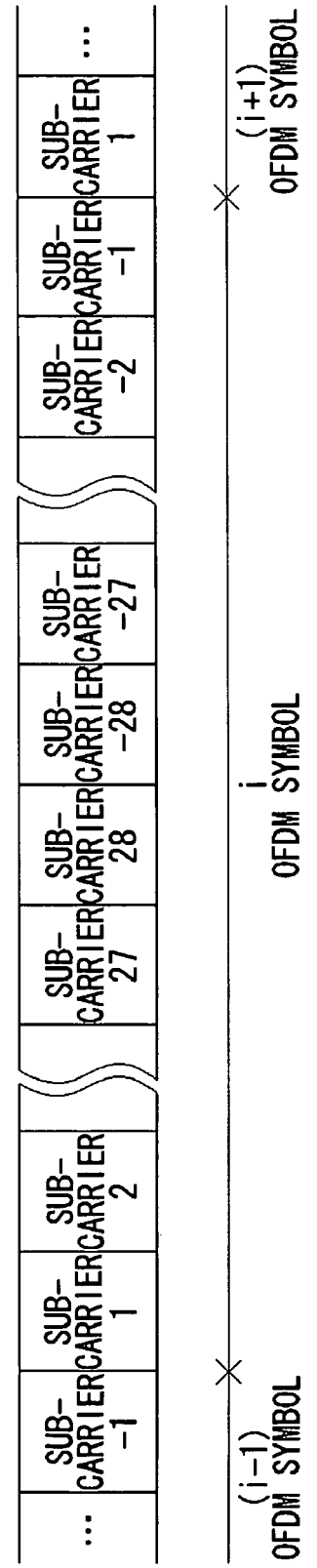
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarrier components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like shown in FIG. 3A or the like, a combination of "−26" to "26" is used for one "OFDM symbol".

Refer back to FIG. 4. The coupling unit 20 demodulates and deinterleaves the combined signal 202 outputted from the processing unit 18. The demodulation is carried out per subcarrier. The coupling unit 20 combines the deinterleaved signals so as to form one data stream. Furthermore, the coupling unit 20 decodes one data stream. The coupling unit 20 outputs the decoded data streams. Here, an example of the coding is convolutional coding, whereas an example of such decoding is Viterbi decoding. Also, to perform the Viterbi decoding, the coupling unit 20 subjects the combined signal 202 to a soft decision. The control unit 22 controls the timing and the like of the first RF unit 16a.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 6:
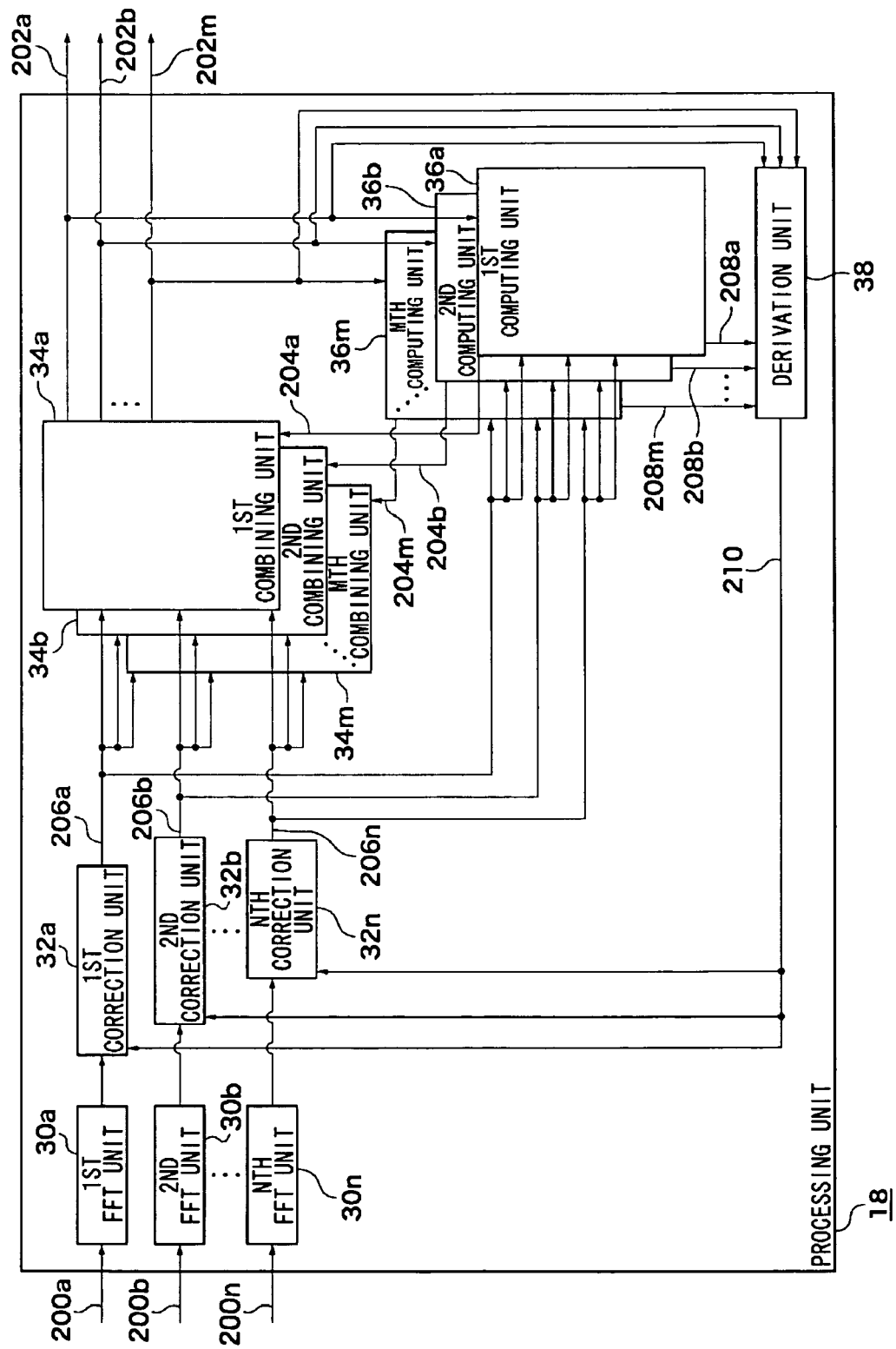
FIG. 6 illustrates a processing unit shown in FIG. 4.

FIG. 6 illustrates a structure of the processing unit 18. The processing unit 18 includes a first FFT unit 30a, a second FFT unit 30b, ... and an Nth FFT unit 30n, which are generically referred to as "FFT unit 30", a first correction unit 32a, a second correction unit 32b, ... and an Nth correction unit 32n, which are generically referred to as "correction unit 32", a first combining unit 34a, a second combining unit 34b, ... and an Mth combining unit 34m, which are generically referred to as "combining unit 34", a first computing unit 36a, a second computing unit 36b, ... and an Mth computing unit 36m, which are generically referred to as "computing unit 36", and a derivation unit 38. Signals involved include a first weight vector 204a, a second weight vector 204b, ... and an Mth weight vector 204m, which are generically referred to as "weight vector 204", a first frequency-domain signal 206a, a second frequency-domain signal 206b, ... and an Nth frequency-domain signal 206n, which are generically referred to as "frequency-domain signal 206", a first error signal 208a, a second error signal, ... and an Mth error signal 208m, which are generically referred to as "error signal 208", and a correcting phase signal 210.

Before a description is given of a structure of the processing unit 18, a description is here given of a processing performed by the processing unit 18. The processings performed by the processing unit 18 are classified into three kinds. The first kind is a processing performed before the start of a data signal (hereinafter this processing will be referred to as "initial processing"). This corresponds to a processing performed after the end of "HT-LTF" and until "Data 1" or the like. The second kind is a processing performed on a pilot signal (hereinafter this processing will be referred to as "pilot signal processing"). The third kind is a processing performed on a data signal (hereinafter this processing will be referred to as "data signal processing").

A description will now be given of abbreviated names used in the following explanation. "Nsym" indicates "the number of symbols". "np" indicates "the number of subcarriers to which a pilot signal is assigned". "nss" indicates "the number of streams". "nd" indicates "the number of subcarriers to which a data signal is assigned". "Nrx" indicates "the number of antennas 14". "[ ]$_{a, b, c}$" indicates "the size of a matrix of a×b×c.

An initial processing will be first descried. A received signal will be separated into a data signal and a pilot signal as follows.

$$[x_{data}(n)]_{nd, nrx} = [x(n)]_{nrx} \quad (1)$$

$$[x_{pilot}(n)]_{np, nrx} = [x(n)]_{nrx} \quad (2)$$

Initial weight vectors are represented by $[W_{data}(1)]_{nd, nss, nrx}$ for the data signal and by $[w_{pilot}(1)]_{nd, nss, nrx}$ for the pilot signal. These are derived based on the operation of "first component−second component+third component−fourth component, first component+second component and the like, as described earlier, corresponding to "HT-LTF" in FIGS. 3A to 3C.

The pilot signal is weighted with a weight vector and combined as expressed by the following Equation (3).

$$[y_{pilot}(1)]_{np, nss} = [w_{pilot}(1)]_{np, nss, nrx} * [x_{pilot}(1)]_{np, nrx} \quad (3)$$

If a pilot signal to be referred to is expressed by $[s_{pilot}(1)]_{np, nrx}$, then the initial phase will be derived as follows in terms of a subcarrier and a stream to which the pilot signal is assigned.

$$[\theta_{init}]_{np, nss} = \text{angle}([y_{pilot}(1)]_{np, nss}/[s_{pilot}(1)]_{np, nss}) \quad (4)$$

For a subcarrier to which the pilot signal is assigned, an initial phase in a different stream is combined therewith as follows so as to derive an initial phase.

$$[\theta_{init}]_{np} = \sum_{nss}\left(\left(\sum_{nrx}(1/|[w_{pilot}(1)]_{np,nss,nrx}|)*[\theta_{init}]_{np,nss}\right)\middle/\sum_{nss}\sum_{nrx}(1/|[w_{pilot}(1)]_{np,nss,nrx}|)\right) \quad (5)$$

In so doing, the weighting based on the magnitude of the weight vector is performed. The weight vector corresponding to the pilot signal is corrected, as follows, by the initial phase.

$$[w_{pilot}(1)]_{np,nss,nrx} = [w_{pilot}(1)]_{np,nss,nrx}*\exp(-j*/\theta_{init}]_{np}) \quad (6)$$

The weight vector corresponding to the data signal is corrected, as follows, by the initial phase.

$$[w_{data}(1)]_{nd,nss,nrx} = [w_{data}(1)]_{nd,nss,nrx}*\exp(-j*/\theta_{init}]_{ceil(nd/13)}) \quad (7)$$

Next, a processing for pilot signals will be described. A frequency for use in correction is updated as follows.

$$[\omega_{pilot}(n)]_{np} = [\omega_{pilot}(n-1)]_{np} + \mu_{pilot_{theta}}*[\Delta\theta_{pilot}(n-1)]_{np} \quad (8)$$

where $\mu_{pilot_{theta}}$ is predetermined. A phase for use in correction is derived based on the frequency for correction, and a received pilot signal is corrected, as follows, by the phase for correction.

$$[x'_{pilot}(n)]_{np,nrx} = [x_{pilot}(n)]_{np,nrx}*\exp(-j*[w_{pilot}(n)]_{np}*(n-1)) \quad (9)$$

The pilot signal is weighted with a weight vector and combined as expressed by the following Equation (10).

$$[y_{pilot}(n)]_{np,nss} = \sum_{nrx}\left([w_{pilot}(n)]_{np,nss,nrx}\right)*\left([x'_{pilot}(n)]_{np,nrx}\right) \quad (10)$$

If a pilot signal to be referred to is expressed by $[s_{pilot}(n)]_{np,nrx}$, then the error will be expressed as follows.

$$[e_{pilot}(n)]_{np,nss} = [s_{pilot}(n)]_{np,nss} - [y_{pilot}(n)]_{np,nss} \quad (11)$$

Further, the weight vector is updated, as follows, by an LMS algorithm.

$$[w_{pilot}(n+1)]_{np,nss,nrx} = [w_{pilot}(n)]_{np,nss,nrx} + \mu_{pilot}*[e^{108}_{pilot}*(n)]_{np,nss}*[x'_{pilot}(n)]_{np,nrx} \quad (12)$$

For a subcarrier to which the pilot signal is assigned, the rotation amount is expressed by the following Equation (13) for each stream.

$$[\Delta\theta_{pilot}(n)]_{np,nss} = \text{real}([e_{pilot}(n)]_{np,nss})*\text{imag}([s_{pilot}(n)]_{np,nss}) - \text{imag}([e_{pilot}(n)]_{np,nss})*\text{real}([s_{pilot}(n)]_{np,nss}) \quad (13)$$

For a subcarrier to which the pilot signal is assigned, the rotation amount is expressed by the following Equation (14).

$$[\Delta\theta_{pilot}(n)]_{np} = \sum_{nss}\left(|[e_{pilot}(n)]_{np,nss}|*[\Delta\theta_{pilot}(n+1)]_{np,nss}\middle/\sum_{nss}|[e_{pilot}(n)]_{np,nss}|\right) \quad (14)$$

Lastly, a processing for data signals will be described. A frequency for use in correction is derived as follows.

$$[\theta_{data}(n)]_{nd} = [\theta_{pilot}(n)]_{ceil(nd/13)}*(n-1) + \mu_{theta}*[\Delta\theta_{data}(n-1)]_{nd} \quad (15)$$

where $\mu_{theta}$ is predetermined. A pilot signal received by the phase for correction is corrected as follows.

$$[x'_{data}(n)]_{nd,nrx} = [x_{data}(n)]_{nd,nrx}*\exp(-j*[\theta_{data}(n)]_{nd}) \quad (16)$$

The data signal is weighted with a weight vector and combined as expressed by the following Equation (17).

$$[y_{data}(n)]_{nd,nss} = \sum_{nrx}\left([w_{data}(n)]_{nd,nss,nrx}\right)*\left([x'_{data}(n)]_{nd,nrx}\right) \quad (17)$$

The thus combined signal is subjected to a hard decision as follows.

$$[d_{data}(n)]_{nd,nss} = \text{Demap\_hard}[y_{data}(n)]_{nd,nss} \quad (18)$$

The error is expressed as follows.

$$[e_{data}(n)]_{nd,nss} = [d_{data}(n)]_{nd,nss} - [y_{data}(n)]_{nd,nss} \quad (19)$$

Further, the weight vector is updated, as follows, by an LMS algorithm.

$$[w_{data}(n+1)]_{nd,nss,nrx} = [w_{data}(n)]_{nd,nss,nrx} + \mu*[e^*_{data}(n)]_{nd,nss}*[x'_{data}(n)]_{nd,nrx} \quad (20)$$

For a subcarrier to which the data signal is assigned, the rotation amount is expressed, for each stream, by the following Equation (21).

$$[\Delta\theta_{data}(n)]_{nd,nss} = \text{real}([e_{data}(n)]_{nd,nss})*\text{imag}([d_{data}(n)]_{nd,nss}) - \text{imag}([e_{data}(n)]_{nd,nss})*\text{real}([d_{data}(n)]_{nd,nss}) \quad (21)$$

For a subcarrier to which the data signal is assigned, the rotation amount is expressed by the following Equation (22).

$$[\Delta\theta_{data}(n)]_{nd} = \sum_{nss}\left(|[e_{data}(n)]_{nd,nss}|*[\Delta\theta_{data}(n)]_{nd,nss}\middle/\sum_{nss}|[e_{data}(n)]_{nd,nss}|\right) \quad (22)$$

Based on the above description for the processing, a description will be given of a structure of the processing unit 18. The FFT unit 30 performs FFT on the time-domain signal 200 so as to convert the time-domain signal 200 into a frequency-domain value. It is assumed here that the frequency-domain value is structured as shown in FIG. 5. That is, a frequency-domain value for one time-domain signal 200 is outputted via one signal line.

The correction unit 32 performs phase correction on the frequency-domain value converted by the FFT unit 30, for each subcarrier. Here, the correcting phase signal 210 is used for the phase correction. Note that the processing by the correction unit 32 is equivalent to Equation (9) of the processing for pilot signals and Equation (16) for data signals. Note also that the corrected signal is expressed as a frequency-domain signal 206.

The combining unit 34 performs adaptive array processing on the frequency-domain signal 206 outputted from the correction unit 32 on a subcarrier-by-subcarrier basis. For example, based on a first weight vector 204a outputted from the first computing unit 36a, the first combining unit 34a performs array combination on the first frequency-domain signal 206a to the Nth frequency-domain signal 206n and then outputs the first combined signal 202a bearing the result thereof. Here, the combined signals 202 correspond respectively to a plurality of streams. That is, by executing the adaptive array processing the combining unit 34 derives values corresponding respectively to a plurality of streams.

More specifically, of the first weight vector 204a the combining unit 34 selects, as a weight vector to which multiplication is to be executed, a weight corresponding to a subcarrier. The selected weight corresponds respectively to the antennas 14. Also, as another weight vector to which multiplication is to be executed, a value corresponding to a subcarrier is selected from the first frequency-domain signal 206a. The selected value corresponds respectively to the antennas 14. Note that the selected weight and the selected value each corresponds to the same subcarrier. While being associated respectively with the antennas 14, the selected weight and the selected value are multiplied to each other and the multiplication results are added together so as to derive a value corresponding to a subcarrier in the first stream. This value corresponds to the value of a subcarrier in the first combined signal 202a.

The first combining unit 34a also performs the above-described processing on other subcarriers so as to derive data corresponding to the first stream. The second combining unit 34b to the Mth combining unit 34m perform the similar processing so as to derive data corresponding respectively to the second stream to the Mth stream. The thus derived first stream to Mth stream are outputted as the first combined signal 202a to the Mth combined signal 202m, respectively. Note that the processing performed by the combining unit 34 is equivalent to Equation (17) of the processing for data signals. Further, the combining unit 34 performs initial processing. Note that the initial processing by the combining unit 34 is equivalent to Equations (1) to (7).

The computing unit 36 derives a weight vector 204, per subcarrier, from the frequency-domain signal 206 and the combined signal 202. The weight vectors 204 are so derived as to correspond respectively to a plurality of streams. And a weight vector 204 corresponding to a stream, e.g., the first weight vector 204a has a parameter corresponding to the number of antennas 14, per subcarrier. An adaptive algorithm is used to derive the weight vectors 204. As described above, an LMS algorithm is used here. Note that the processing performed by the combining unit 34 is equivalent to Equations (11) and (12) of the processing for pilot signals and Equations (18), (19) and (20) of the processing for data signals.

Based on error contained in the combined signal 202, namely the error signal 208, the derivation unit 38 derives, per subcarrier, the correcting phase signal 210 which is designed to be used in the correction unit 32. Note that the error signal 208 for a subcarrier to which a pilot signal is assigned is derived by Equation (11) and the error signal 208 for a subcarrier to which a data signal is assigned is derived by Equation (19). For a subcarrier to which the pilot signal is assigned, the derivation unit 38 drives a phase for correction in a manner that a frequency for correction is updated based on the error signal 208 in said subcarrier. The above-described processing is equivalent to Equation (13), Equation (14) and Equation (8).

For a subcarrier to which the data signal is assigned, the derivation unit 38 derives a phase for correction, based on the error in said subcarrier and a phase for correction in the subcarrier to which the pilot signal is assigned. The above-described processing is equivalent to Equation (21), Equation (22) and Equation (15). Detailed description of the above-described processing will be given later. Though the correcting phase signal 210 is derived on a subcarrier-by-subcarrier basis, it is derived all together for the antennas 14.

Figure 7:
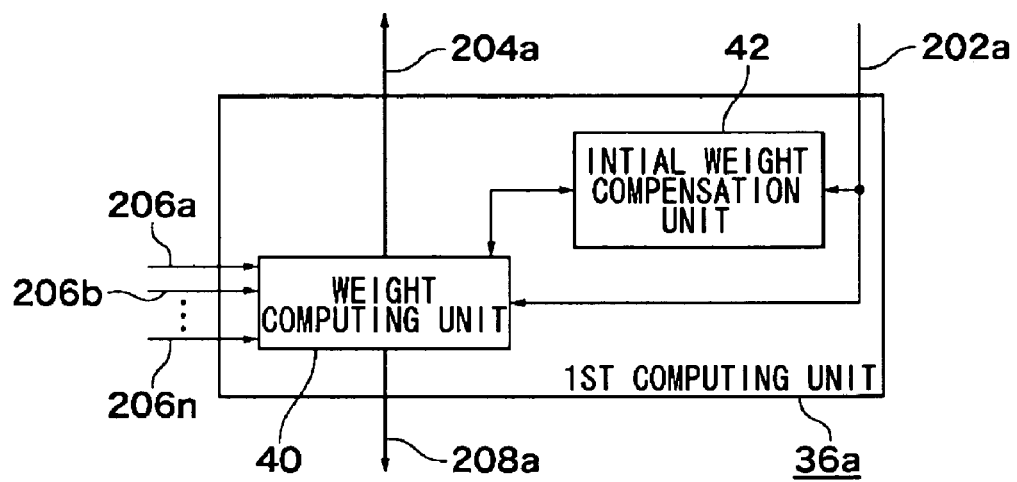
FIG. 7 illustrates a structure of a first computing unit shown in FIG. 6.

FIG. 7 illustrates a structure of the first computing unit 36a. The first computing unit 36a includes a weight computing unit 40 and an initial weight compensation unit 42. The second computing unit 36b to the Mth computing unit 36m are structured in the similar manner.

The weight computing unit 40 receives a frequency-domain signal 206 and performs an LMS algorithm on subcarriers to which pilot signals are assigned to and those to which data signals are assigned, respectively. As a result, the weight computing unit 40 derives the first weight vector 204a. The weight computing unit 40 also derives the first error signal 208a. Note that the LMS algorithm is performed on a subcarrier-by-subcarrier basis. Here, the first weight vector 204a and the first error signal 208a are each structured as in FIG. 5 and each contains components corresponding to a plurality of subcarriers.

The initial weight compensation unit 42 performs initial processing on between "HT-LTF" and "DATA 1" in FIGS. 3A to 3C. Here, based on a preamble assigned to a packet signal, namely based on "HT-LTF", the weight vector 204 for use in adaptive array processing is derived, per subcarrier, by the weight computing unit 40. Based on the thus derived weight vector 204, the combining unit 34 carries out adaptive array processing in units of subcarrier. Based on the result of adaptive array processing, namely based on the combined signal 202 and the pilot signal, the initial weight compensation unit 42 derives the initial phase for each stream on a subcarrier-by-subcarrier basis. The above-described processing is equivalent to Equation (3) and Equation (4).

Further, the initial weight compensation unit 42 weights initial phases in different subcarriers, per subcarrier, so as to be combined, thereby deriving an initial phase for each subcarrier. Here, a reciprocal of an absolute value of a value in a stream and a subcarrier to be associated with in a weight vector is used in the weighting. This is because the likelihood of the initial phase for each stream increases proportionally to the SNR value. This processing is equivalent to Equation (5). The initial weight compensation unit 42 outputs the initial phase per subcarrier to the weight computing unit 40. As with Equations (6) and (7), the weight computing unit 40 corrects the weight vector 204 with the initial value per subcarrier.

Figure 8:
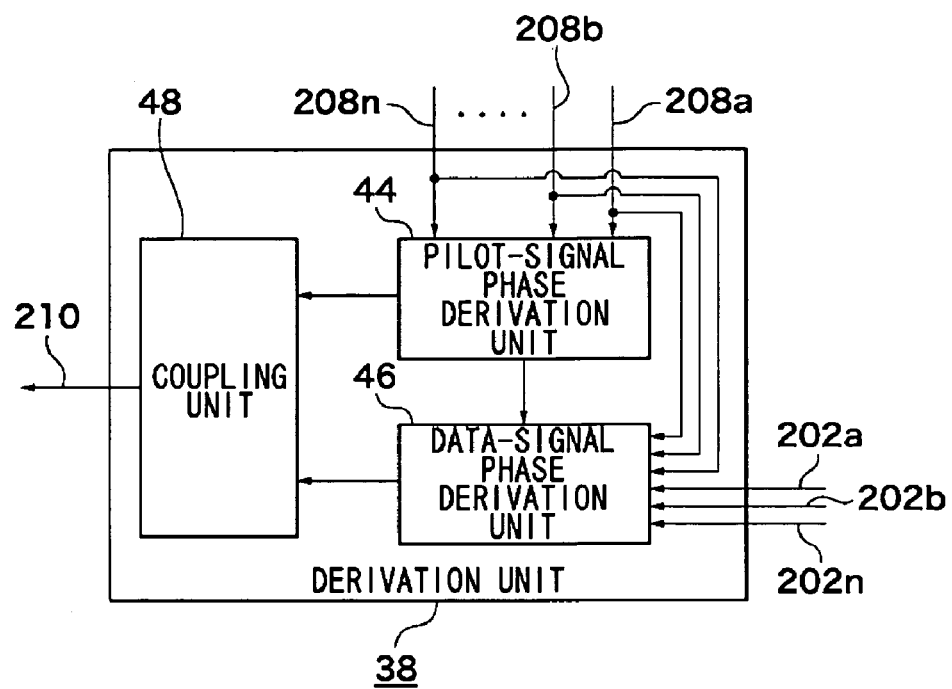
FIG. 8 illustrates a structure of a derivation unit shown in FIG. 6.

FIG. 8 illustrates a structure of the derivation unit 38. The derivation unit 38 includes a phase derivation unit 44 for pilot signals, a phase derivation unit 46 for data signals, and a coupling unit 48. The pilot-signal phase derivation unit 44 executes the above-described processing for pilot signals. The pilot-signal phase derivation unit 44 receives, from a not-shown computing unit 36, the error signal 208 for a subcarrier to which the pilot signal is assigned. The pilot-signal phase derivation unit 44 also derives the rotation amount in said subcarrier, from the error signal 208 and the pilot signal. Here, the pilot-signal phase derivation unit 44 derives the rotation amount for each of a plurality of streams, on a subcarrier-by-subcarrier basis. The above-described processing is equivalent to Equation (13).

The pilot-signal phase derivation unit 44 derives the rotation amount per subcarrier by combining rotation amounts in different streams, per subcarrier. This processing is equivalent to Equation (14). Further, as in Equation (8) the pilot-signal phase derivation unit 44 updates the frequency for correction in said subcarrier by the thus derived rotation amount, and derives the phase for correction in said subcarrier from the updated frequency for correction. That is, a phase to be used to correct the pilot signal in the correction unit 32 is derived.

The data-signal phase derivation unit 46 performs the above-described processing for pilot signals. The data-signal phase derivation unit 46 receives, from a not-shown computing unit 36, the error signal 208 for a subcarrier to which the data signal is assigned and the data-signal phase derivation unit 46 receives the combined signal for a subcarrier to which the data signal is assigned. The pilot-signal phase derivation unit 44 derives the rotation amount in said subcarrier, from the decision value of the combined signal 202 and the error signal 208. Here, the data-signal phase derivation unit 46 derives the rotation amount for each of a plurality of streams in units of subcarrier. The above-described processing is equivalent to Equation (21).

The data-signal phase derivation unit 46 derives the rotation amount per subcarrier by combining rotation amounts in different streams, per subcarrier. This processing is equivalent to Equation (22). Further, as in Equation (15) the data-signal phase derivation unit 46 derives a phase for correction in a subcarrier to which the data signal is assigned, from the phase for correction in the subcarrier to which the pilot signal is assigned. Here, a phase for correction in a subcarrier assigned in the vicinity of the subcarrier to which the data signal is assigned is used as a phase for correcting a pilot signal. As a result, the data-signal phase derivation unit 46 derives, subcarrier by subcarrier, the data correcting phase to be used by the correction unit 32.

The coupling unit 48 combines the pilot correcting phase derived by the pilot-signal phase derivation unit 44 and the data correcting phase derived by the data-signal phase derivation unit 46 and then outputs the correcting phase signal 210. That is, the correcting phase signals 210 corresponding respectively to all of the subcarriers are generated. Note that the correcting phase signal 210 is of the format shown in FIG. 5.

Figure 9:
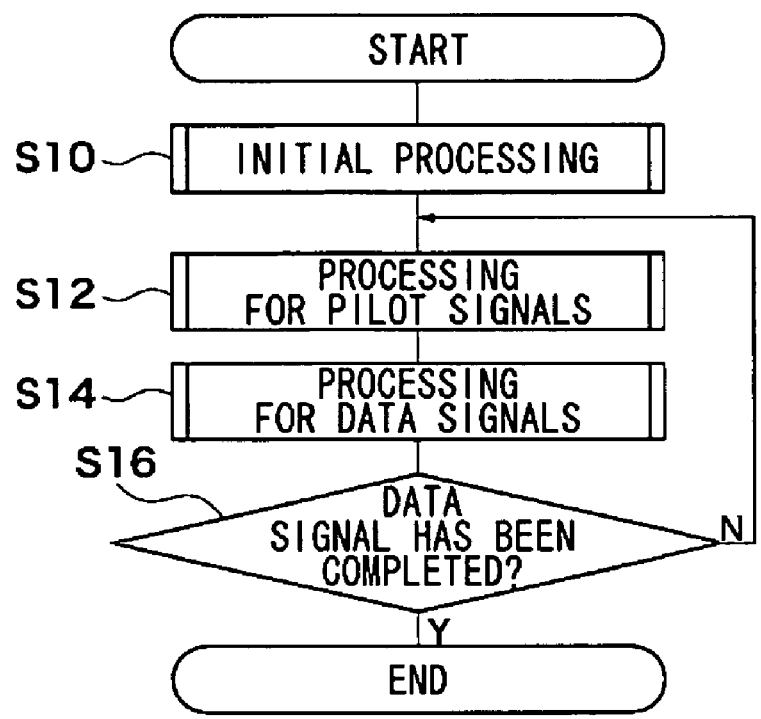
FIG. 9 is a flowchart showing a receiving procedure by the processing unit shown in FIG. 6.

An operation of the processing unit structured as above will be described. FIG. 9 is a flowchart showing a receiving procedure by the processing unit 18. The combining unit 34 and the computing unit 36 perform initial processing (S10). The combining unit 34, the computing unit 36, the derivation unit 38 and the correction unit 32 perform processing for pilot signals (S12). The combining unit 34, the computing unit 36, the derivation unit 38 and the correction unit 32 then perform processing for data signals (S14). If period of a data signal has not been completed (N of S16), the processing from Step 12 onward will be repeated. If, on the other hand, period of the data signal has been completed (Y of S16), the processing will terminate.

Figure 10:
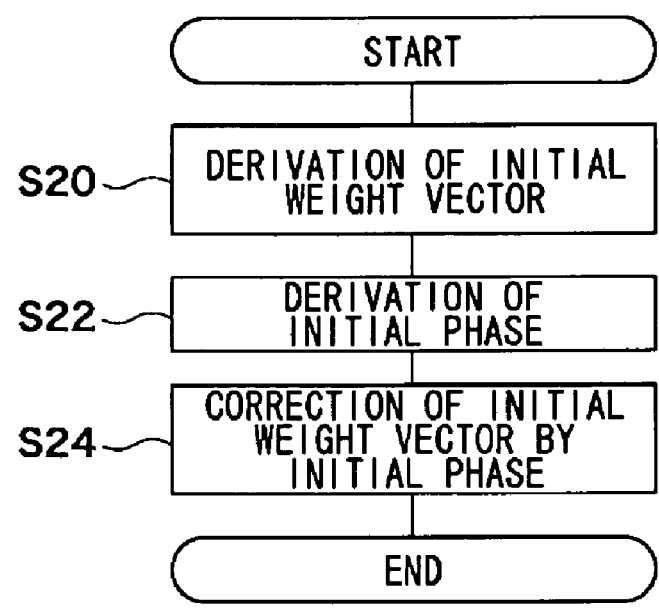
FIG. 10 is a flowchart showing a procedure for initial processing shown in FIG. 9.

FIG. 10 is a flowchart showing a procedure for initial processing. This corresponds to Step 10 in FIG. 9. The computing unit 36 derives initial weight vectors (S20). The computing unit 36 also derives initial phases (S22). Further, the computing unit 36 corrects the initial weight vector with the initial phase (S24).

Figure 11:
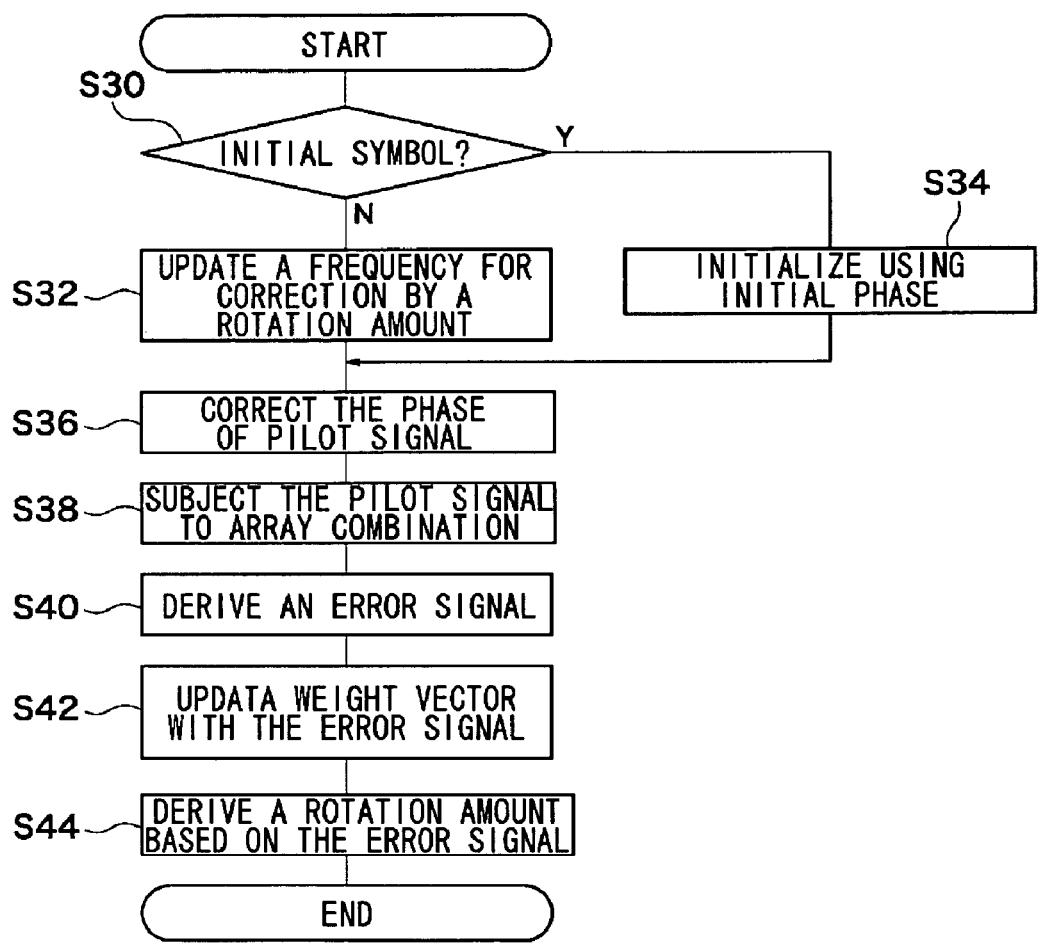
FIG. 11 is a flowchart showing a procedure for pilot signals shown in FIG. 9.

FIG. 11 is a flowchart showing a procedure for pilot signals. This corresponds to Step 12 of FIG. 9. If it is not a first symbol (N of S30), the derivation unit 38 will update the frequency for correction by a rotation amount (S32). If it is a first symbol (Y of S30), the derivation unit 38 will set the value obtained as a result of the initial phase divided by the number of symbols in "HT-LTF", to the frequency for correction (S34). The correction unit 32 corrects the phase of pilot signals, by a correcting phase signal 210 in accordance with the frequency for correction (S36). The combining unit 34 performs array combination on the corrected pilot signals (S38) so as to output the combined signal 202. The computing unit 36 derives an error signal 208 from the combined signal 202 (S42) and updates the weight vector 204 with the error signal 208 (S42). The derivation unit 38 derives a rotation amount based on the error signal 208 (S44).

Figure 12:
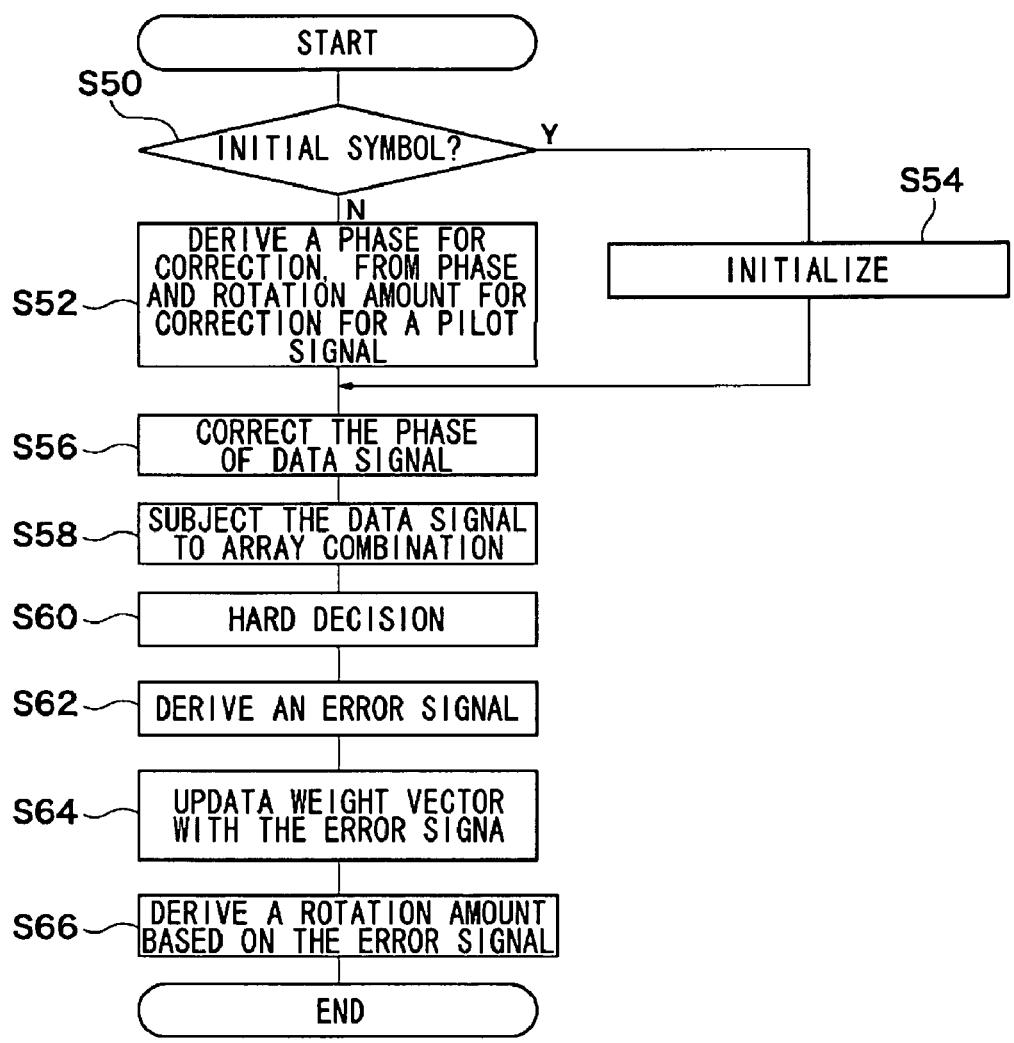
FIG. 12 is a flowchart showing a procedure for data signals shown in FIG. 9.

FIG. 12 is a flowchart showing a procedure for data signals. This corresponds to Step 14 of FIG. 9. If it is not a first symbol (N of S50), the derivation unit 38 will derive the frequency for correction from the phase for correction in a pilot signal and the rotation amount (S52). If it is a first symbol (Y of S50), the derivation unit 38 will initialize the phase for correction (S54). The correction unit 32 corrects phase for data signals, by a correcting phase signal 210 in accordance with the phase for correction (S56). The combining unit 34 performs array combination on the corrected pilot signals (S58) so as to output the combined signal 202. After making a hard decision on the combined signal 202 (S60), the computing unit 36 derives an error signal 208 from the combined signal 202 and a hard-decision value (S62) and updates the weight vector 204 with the error signal 208 (S64). The derivation unit 38 derives a rotation amount based on the error signal 208 (S66).

According to the exemplary embodiments of the present invention, phases for correction are derived not only for a subcarrier to which a pilot signal is assigned but also for a subcarrier to which a data signal is assigned. Thereby, even if the frequency offset differs for each subcarrier, the frequency offsets can be corrected. Also, the correction of frequency offsets can enhance the receiving characteristics. Also, since the phase for correction for a subcarrier to which a pilot signal is assigned and the one for a subcarrier to which a data signal is assigned are derived by two different methods, the phase for correction suitable for each subcarrier can be derived. Moreover, the phase for correction for the subcarrier to which the pilot signal is assigned is derived and therefore the frequency for correction is updated, so that the frequency can approach the optimum frequency value.

Moreover, the phase for correction for the subcarrier to which the data signal is assigned is derived and therefore the frequency for correction is not updated, so that the effect of the error in determination of a combined signal corresponding to the data signal can be reduced. Of subcarriers to which the pilot signals are assigned, the phase for correction assigned to a subcarrier close thereto is used, so that the difference from the phase for correction can be made smaller even if it is a different subcarrier. In general, the phase for correction for a subcarrier to which a pilot signal is assigned has higher accuracy than that for a subcarrier to which a data signal is assigned, and the former is used to derive the latter. Hence, the latter can be derived with increased accuracy.

Further, since the frequency for correction is updated while the pilot signals are being used, the accuracy of frequency for correction can be enhanced. Since the phase for correction in a subcarrier to which a data signal is assigned is derived and therefore the error which occurred in said subcarrier is used, the accuracy of derivation can be enhanced. Since the phase error in a period from the end of a preamble signal until the start of a data signal is derived, the effect of a frequency offset occurring during said period can be reduced. Since the rotation amounts in different streams are combined on a subcarrier-by-subcarrier basis, the adverse effect of noise can be made small. Since the rotation amounts among subcarriers are not combined, the phase for correction for each subcarrier can be independently derived. Since the weighting is performed at the time of the combining, a value having a higher reliability can be made larger.

The present invention has been described based on the exemplary embodiments. These embodiments are merely exemplary, and it is understood by those skilled in the art that various modifications to the combination of each component and each process thereof are possible and that such modifications are also within the scope of the present invention.

According to the exemplary embodiments of the present invention, the description has been given centering around a case where the number of streams is "4". However, this should not be considered as limiting and, for example, the number of a plurality of streams may be less than "4" or may be greater than "4". Along with this example, the number of antennas 14 may be less than "4" in the former case and may be greater than 4". In such cases, the number of streams contained in one group may be greater than "2", or the number of groups may be greater than "2". According to this modification, the present invention can be applied to a variety of the number of streams.

In the exemplary embodiments of the present invention, the receiving apparatus 50 is applied to a MIMO system. However, this should not be considered as limiting and, for example, it may be applied not only to the MIMO system but also to a system in which the packet signal composed of a single stream is transmitted. In such a case, there will be provided a single combining unit 34 and a single computing unit 36. Also, the combining done among streams in the combining unit 34 or derivation unit 38 is omitted. According to this modification, the present invention can be applied to a variety of communication systems. That is, the same advantages can be obtained as long as multicarrier signals are used.

While the preferred embodiments of the present invention have been described using specific terms, such description is for illustrative purposes only, and it is to be understood that changes and variations may be made without departing from the spirit or scope of the appended claims.

What is claimed is:

1. A receiving apparatus, comprising:
   a receiver which receives multicarrier signals in which a known signal is assigned to at least one carrier, respectively, by a plurality of antennas;
   a correction unit which corrects, carrier by carrier, phases of the multicarrier signals received respectively by the plurality of antennas in said receiver;
   a processing unit which performs adaptive array processing on the multicarrier signals corrected by said correction unit, for each carrier; and
   a derivation unit which derives, per carrier, a phase for correction to be used for said correction unit, based on error in the multicarrier signals which have undergone the adaptive array processing in said processing unit,
   wherein said derivation unit derives the phase for correction by updating a frequency for correction about a carrier to which the known signal is assigned, based on error in said carrier, and derives the phase for correction about a carrier to which the known signal is not assigned, based on error in said carrier and the phase for correction in the carrier to which the known signal is assigned.

2. A receiving apparatus according to claim 1, when deriving the phase for correction about the carrier to which the known signal is not assigned, said derivation unit uses a phase for correction in a carrier which is assigned in the vicinity of the carrier and to which the known signal is assigned.

3. A receiving apparatus according to claim 1, wherein said derivation unit includes: a means which derives, for the carrier to which the known signal is assigned, error in said carrier from a result of the adaptive array processing by said processing unit and a value of the known signal; a means which derives a rotation amount in said carrier, from the derived error and the value of the known signal; a means which updates a frequency for correction in said carrier by the derived rotation amount; and a means which derives a phase for correction in said carrier from the updated frequency for correction.

4. A receiving apparatus according to claim 1, wherein said derivation unit includes: a means which derives, for the carrier to which the known signal is not assigned, error in said carrier from a result of the adaptive array processing by said processing unit and a decision value of the result; a means which derives a rotation amount in said carrier, from the derived error and the decision value; and a means which derives a phase for correction in a carrier to which the known signal is not assigned, from the derived rotation amount and a phase for correction in a carrier to which the known signal is assigned.

5. A receiving apparatus according to claim 1, wherein the multicarrier signals received by said receiver constitute a packet signal, and a preamble is assigned to an anterior part of the packet signal, and
   wherein said processing unit includes: a means which derives, per carrier, a weight vector used for the adaptive array processing, for each of the multicarrier signals to be received by the plurality of antennas in said receiver, based on the preamble assigned to the packet signal received by said receiver; a means which performs the adaptive array processing, per carrier, based on the derived weight vector; a means which derives an initial phase, per carrier, based on a result of the adaptive array processing and a pilot signal; and a means which corrects the weight vector by the derived initial phase.

6. A receiving apparatus according to claim 5, wherein the packet signal received by said receiver is constituted by a plurality of streams, and
   wherein said processing unit derives an initial phase carrier by carrier in a manner that the initial phase for each stream is derived carrier by carrier and then initial phases in different carriers are combined by weighting them per carrier.

7. A receiving apparatus according to claim 1, wherein the multicarrier signal received by said receiver is constituted by a plurality of streams, and
   wherein said processing unit derives values corresponding respectively to the plurality of streams, by performing the adaptive array processing, and
   wherein said derivation unit derives a phase for correction to be used in said correction unit, carrier by carrier, in a manner that rotation amounts are derived, carrier by carrier, for the plurality of streams respectively and then rotation amounts in different streams are combined carrier by carrier.

8. A receiving method, comprising:
   receiving multicarrier signals in which a known signal is assigned to at least one carrier, respectively, by a plurality of antennas;
   correcting, carrier by carrier, phases of the multicarrier signals received respectively by the plurality of antennas;
   performing adaptive array processing on the multicarrier signals corrected by said correcting, for each carrier; and
   deriving, per carrier, a phase for correction to be used in said correcting carrier by carrier, based on error in the multicarrier signals which have undergone the adaptive array processing,
   wherein said deriving derives the phase for correction by updating a frequency for correction about a carrier to which the known signal is assigned, based on error in said carrier, and derives the phase for correction about a carrier to which the known signal is not assigned, based on error in said carrier and the phase for correction in the carrier to which the known signal is assigned.

* * * * *